United States Patent [19]

Miseyko et al.

[11] Patent Number: 4,637,577
[45] Date of Patent: Jan. 20, 1987

[54] DISCARD ASSEMBLY FOR PARACHUTE DEPLOYMENT MECHANISM

[75] Inventors: George Miseyko; Walter R. Peck, both of Asheville; Ronald G. Chase, Arden, all of N.C.

[73] Assignee: Stencel Aero Engineering Corp., Arden, N.C.

[21] Appl. No.: 858,839

[22] Filed: Apr. 29, 1986

Related U.S. Application Data

[63] Continuation of Ser. No. 593,862, Mar. 27, 1984, abandoned.

[51] Int. Cl.$^4$ .............................................. B64D 17/62
[52] U.S. Cl. .................................... 244/147; 244/142; 244/149
[58] Field of Search ............... 244/142, 145, 147, 149, 244/151 B, 122 AE

[56] References Cited

U.S. PATENT DOCUMENTS

| | | | |
|---|---|---|---|
| 3,433,440 | 3/1969 | Stanley | 244/137 |
| 3,436,037 | 4/1969 | Stanley | 244/122 |
| 3,595,501 | 7/1971 | Stencel et al. | 244/142 |
| 3,726,499 | 4/1973 | Stencel | 244/141 |
| 3,776,493 | 12/1973 | Matsuo | 244/147 |

FOREIGN PATENT DOCUMENTS

| | | | |
|---|---|---|---|
| 1435063 | 3/1966 | France | 244/147 |
| 712303 | 7/1954 | United Kingdom | 244/151 B |
| 1320223 | 6/1973 | United Kingdom | 244/147 |

Primary Examiner—Sherman D. Basinger
Assistant Examiner—Rodney Corl
Attorney, Agent, or Firm—Roylance, Abrams, Berdo & Goodman

[57] ABSTRACT

For use with a parachute used after ejection from an aircraft, a discard assembly for disconnecting a parachute deployment mechanism from the parachute in response to the opening of the parachute by a preselected amount. The discard assembly includes a pair of releasably interconnected rods enclosed in a slidable housing. An actuator assembly is coupled to the housing and to the parachute and slides the housing away from one of the rods, thereby allowing them to disconnect, upon opening of the parachute by the preselected amount. The actuator assembly comprises a pair of rings coupled to the parachute on opposite sides of the parachute vent, and a pair of lanyards coupled to the housing and to the parachute, with each lanyard passing through one of the rings. The force generated by the transverse expansion of the opening parachute is transmitted via these rings and lanyards to actuate the discard assembly. The deployment mechanism can include a drogue parachute and a rocket, and four rings and lanyards can be used to add redundancy.

18 Claims, 10 Drawing Figures

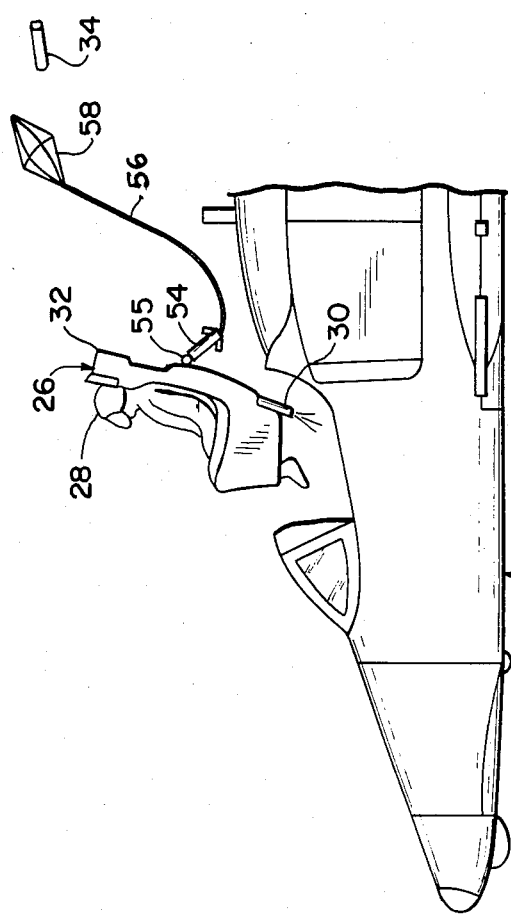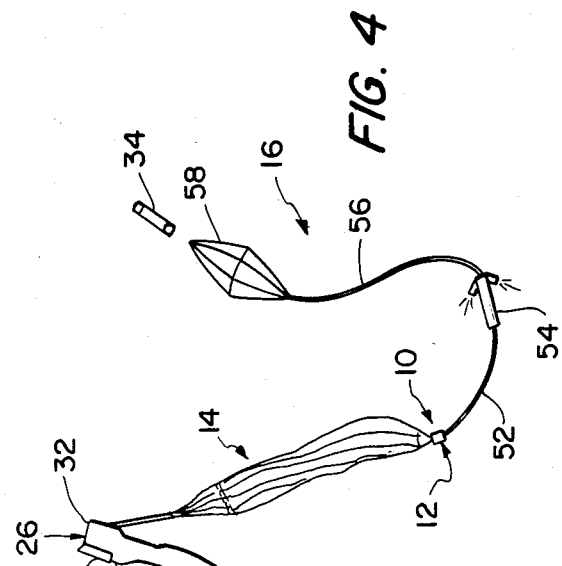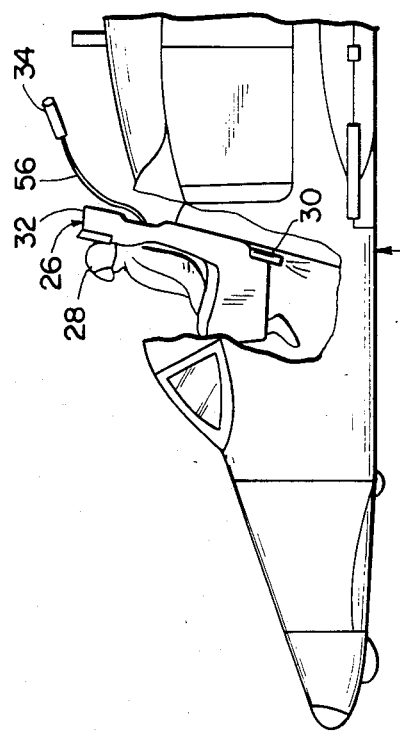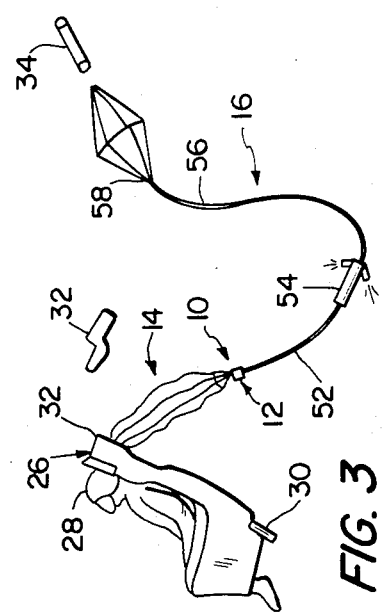

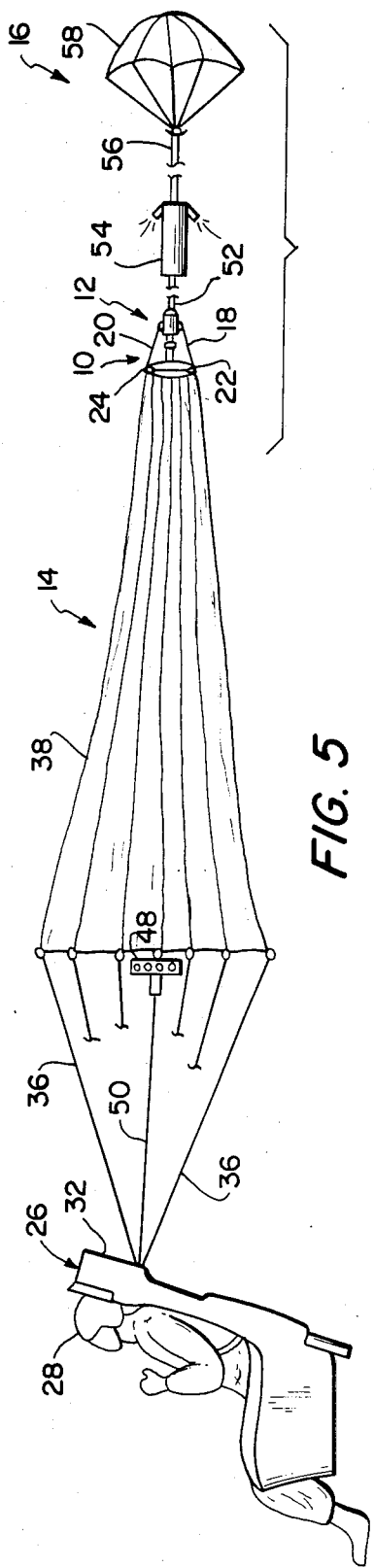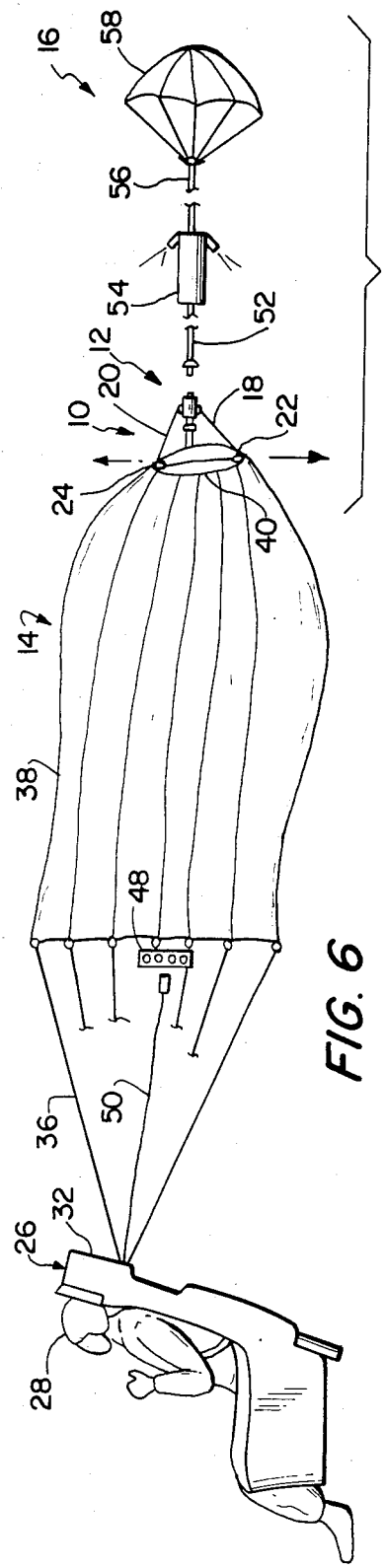

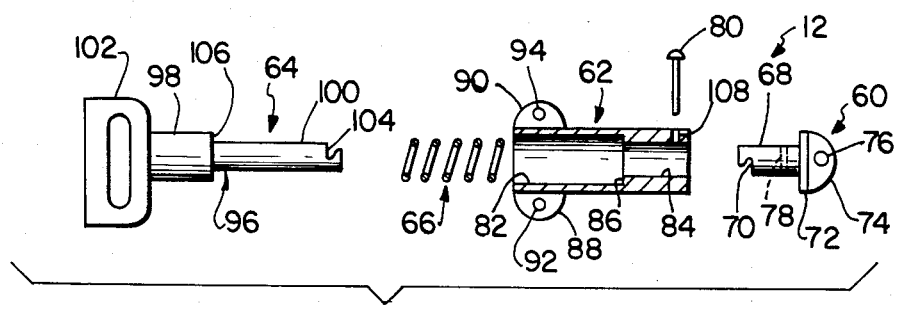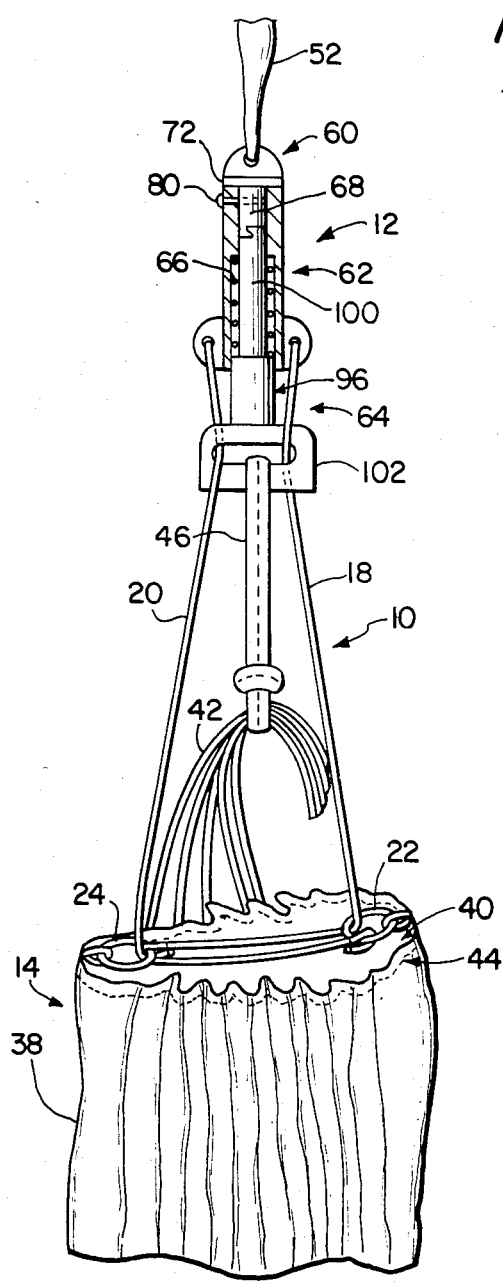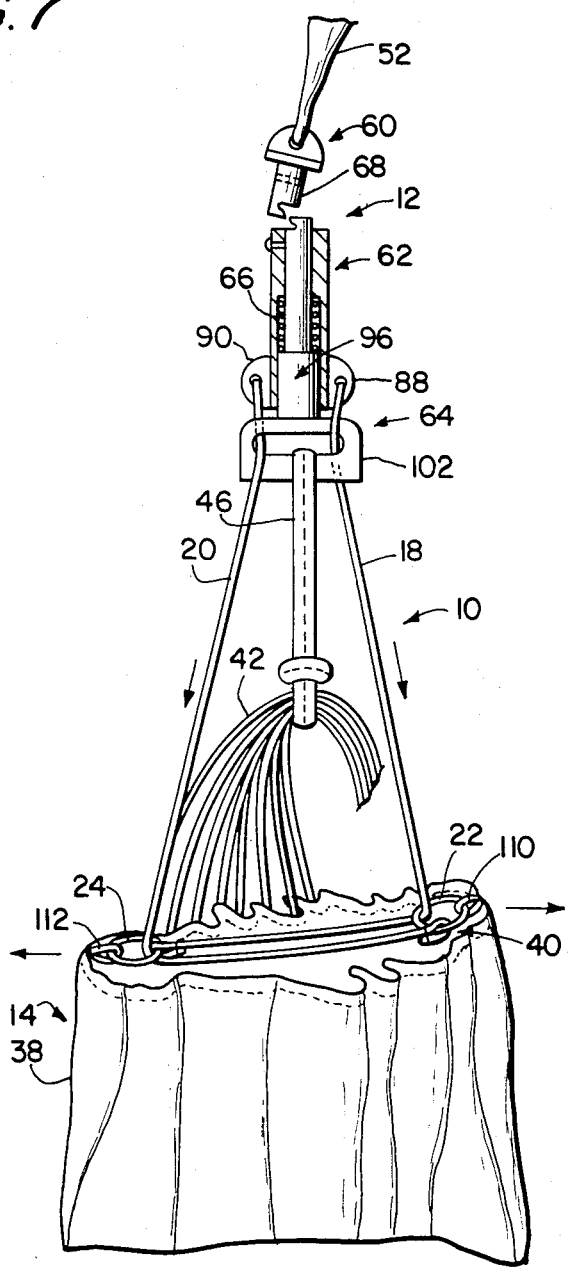

DISCARD ASSEMBLY FOR PARACHUTE DEPLOYMENT MECHANISM

This is a continuation of application Ser. No. 593,862 filed Mar. 27, 1984 abandoned.

FIELD OF THE INVENTION

The invention relates to deploying a parachute following ejection from an aircraft. More particularly, the invention relates to a discard assembly for disconnecting a parachute deployment mechanism from the parachute once the parachute begins opening. The force generated by the transverse expansion of the opening parachute is transmitted to the discard assembly, which is thereby actuated to disconnect the deployment mechanism from the parachute.

BACKGROUND OF THE INVENTION

Ejection seats have long been known for propelling an aircraft crewmember from a damaged aircraft so that the crewmember can safely deploy a parachute once clear of the aircraft and return safely to the ground. Typically, the deployment mechanism comprises a rocket or a drogue parachute, or a combination of them, which pulls the parachute from a container carried either by the crewmember or the ejection seat. However, once the deployment mechanism has served its function it is highly desirable to discard this mechanism from the parachute.

One reason to discard this mechanism is that it tends to tangle the parachute. Another reason is that the rocket is usually very hot and can swing into and burn the crewmember or the parachute material. A third reason is that discarding the deployment mechanism reduces the mass aft of the parachute and thereby reduces the shock to the crewmember due to the inertial snatch force generated by the complete opening of the parachute.

While there have been numerous prior art attempts at providing an advantageous and efficient discard assembly, they have numerous problems, be they formed as line cutters activated by snub lines or explosive devices. For one thing, these devices tend to weigh a lot and in addition are bulky. Moreover, they tend to work in an unreliable fashion and at unreliable times. In this regard, it is very important for the discard assembly to be activated after the parachute is fully extracted from its container but before it is fully opened in order to reduce the shock to the crewmember as outlined above.

Examples of these prior art discard assemblies are disclosed in U.S. Pat. Nos. 3,433,440 to Stanley; 3,436,037 to Stanley; 3,595,501 to Stencel et al; and 3,726,499 to Stencel.

SUMMARY OF THE INVENTION

Accordingly, a primary object of the invention is to provide a discard assembly for a parachute deployment mechanism that is simple in construction, adds little extra weight to the parachute equipment, and is not unduly bulky.

Another object of the invention is to provide such a discard assembly that functions reliably and at the appropriate time.

Another object of the invention is to provide such a discard assembly that disconnects the deployment mechanism from the parachute after the parachute is extracted from its container but before it is fully opened.

A further object of the invention is to provide such a discard assembly that is actuated in response to the opening of the parachute by a preselected amount and is powered by the force generated by the transverse expansion of the opening parachute.

The foregoing objects are basically attained in a parachute deployment assembly including a parachute packed in a container, a deployment mechanism for extracting the parachute from the container, and a discard assembly for discarding the deployment mechanism from the parachute, the improvement comprising an actuator assembly, coupled to the parachute and to the discard assembly, for actuating the discard assembly in response to the opening of the parachute by a preselected amount.

In particular, the actuator assembly includes a pair of lanyards and a pair of rings for transmitting the force generated by the transverse expansion of the parachute to the discard assembly.

The foregoing objects are also attained by a method of deploying a parachute from a container and discarding the deployment mechanism therefrom, comprising the steps of pulling the parachute from the container via a deployment mechanism, initiating the opening of the parachute, and disconnecting the deployment mechanism from the parachute in response to the opening of the parachute by a preselected amount.

In particular, the disconnecting step utilizes the force generated by the opening of the parachute to disconnect the deployment mechanism from the parachute.

Other objects, advantages and salient features of the present invention will become apparent from the following detailed description, which, taken in conjunction with the annexed drawings, discloses a preferred embodiment of the invention.

DRAWINGS

Referring now to the drawings which form a part of this original disclosure:

FIG. 1 is a diagrammatic side elevational view of a crewmember beginning ejection from an aircraft in an ejection seat with a drogue parachute container being catapulted therefrom;

FIG. 2 is a diagrammatic side elevational view similar to that shown in FIG. 1 except that a deployment rocket releasably connected to the seat and connected to the drogue parachute has pivoted away from the seat;

FIG. 3 is a diagrammatic side elevational view similar to that shown in FIG. 2 except that the deployment rocket has separated from the seat and the main parachute is exiting from its container on the seat under the influence of the rocket and the drogue parachute;

FIG. 4 is a diagrammatic side elevational view similar to that shown in FIG. 3 except that the parachute is pulled completely from its container on the seat;

FIG. 5 is a diagrammatic side elevational view similar to that shown in FIG. 4 except it is enlarged and a spreading gun has initiated opening of the parachute;

FIG. 6 is a diagrammatic side elevational view similar to that shown in FIG. 5 except that the parachute has opened an additional amount and is beginning to receive air therein, the discard assembly thus being actuated to discard the deployment mechanism from the parachute;

FIG. 7 is an enlarged, exploded side elevational view with parts in section showing details of the discard assembly shown in FIGS. 5, 6, 8 and 9;

FIG. 8 is an enlarged, side elevational view with parts in section showing the actuator assembly in accordance with the invention as illustrated in FIG. 5 but in more detail, the actuator assembly being coupled to the discard assembly and the parachute;

Figure 10:
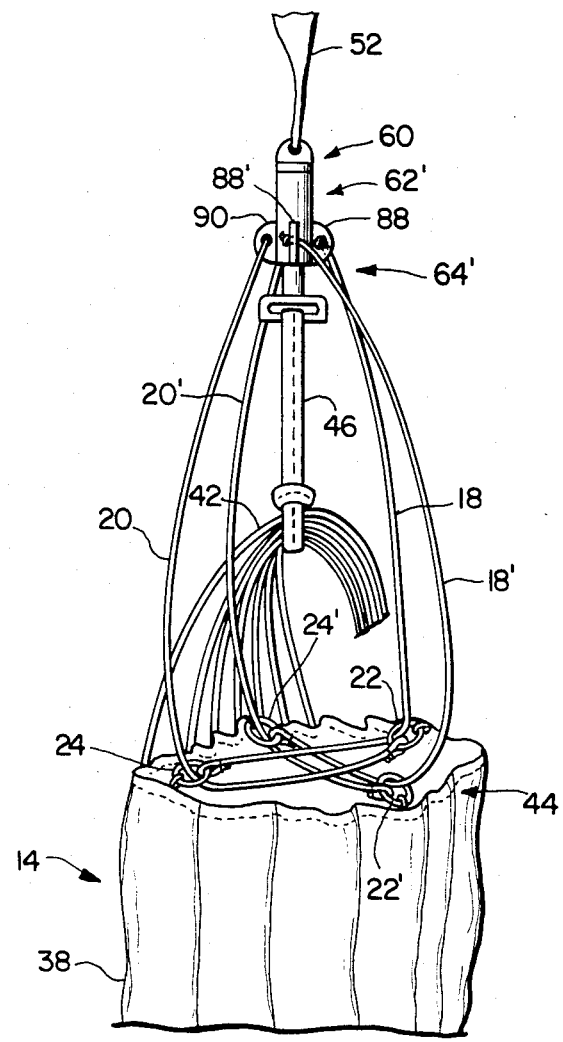

FIG. 9 is a side elevational view similar to that shown in FIG. 8 except that the parachute has opened a preselected amount, thereby actuating the discard assembly to disconnect the deployment mechanism from the parachute, as illustrated also in FIG. 6; and FIG. 10 is a side elevational view of a modified embodiment of the invention which is similar to that shown in FIGS. 8 and 9, except four pulley rings and four initiator lanyards are used.

DETAILED DESCRIPTION OF THE INVENTION

Referring now to FIGS. 1-9, the present invention is basically directed to an actuator assembly 10 used in conjunction with a discard assembly 12 releasably interconnecting a parachute 14 and a parachute deployment mechanism 16. The actuator assembly 10 comprises a pair of lanyards 18 and 20 and a pair of rings 22 and 24 which transmit the force generated by the transverse expansion of the opening parachute to the discard assembly 12 to discard the deployment mechanism 16. Since the actuator assembly does not use explosive devices or line cutters, it is light in weight and not bulky. Moreover, since the actuator assembly utilizes the opening of the parachute to actuate the discard assembly, this assures discard after the parachute is extracted from its container and after the parachute begins to open. Thus, the inertial snatch force to which the ejecting crewmember is subjected is less when the parachute fully opens.

Turning now to FIGS. 1-4, the present invention is intended for use with an ejection seat 26 used to eject a crewmember 28 from an aircraft 29, with the crewmember ultimately returning safely to earth via main parachute 14. The ejection seat 26 can be constructed in accordance with U.S. Pat. Nos. 3,525,490 or 3,542,319, the disclosures of which are hereby incorporated by reference. In all events, the ejection seat can include an ejection rocket 30 or similar device to propel the seat from the aircraft and includes a first container 32 with a releasable lid housing the parachute and a second deployable 34 separately housing the drogue parachute portion of the deployment mechanism 16. Alternatively, container 32 for the parachute could be directly strapped to the crewmember.

As seen in FIG. 5, parachute 14 includes a plurality of suspension lines 36 and a canopy 38. These suspension lines 36 are ultimately connected to the crewmember so that once the parachute is fully opened the crewmember can leave the ejection seat and travel to the ground separately via the parachute.

Centrally located at the apex of the canopy is a circular opening of vent 40 through which air can flow as the parachute is opening and descending in the opened condition. As seen in FIGS. 8 and 9, a plurality of vent lines 42 are connected at their opposite ends to opposed sides of the hem 44 in the canopy defining the vent. A strap or bridle 46 is connected to these vent lines at one of its ends and is connected to the discard assembly 12 at the other of its ends.

As illustrated in FIGS. 5 and 6, the canopy 38 of the parachute is opened by means of a reefing device 48 in the form of a ballistic spreading gun that is actuated via a snub line 50 that is coupled to the ejection seat. This ballistic spreading gun can be constructed in accordance with the disclosure in U.S. Pat. No. 3,281,098, the disclosure of which is hereby incorporated by reference. Alternatively, the canopy of the parachute can open merely due to the airstream air pressure to which the canopy is exposed after the ejection of the ejection seat from the aircraft.

Referring again to FIGS. 3-6, the deployment mechanism 16 is shown comprising a first line 52 connected to the discard assembly 12 (as also shown in FIGS. 8 and 9), a rocket 54 connected to the first line 52, a second line 56 connected to the rocket, and a drogue or auxiliary parachute 58 connected to the second line. The first line 52 is connected conventionally to the rocket 54 which in turn is initially attached conventionally to the ejection seat by retractable hinge pins 55 as seen in FIG. 2. The drogue parachute 58 can be used to slow down and stabilize the ejection seat immediately after ejection and align the rocket prior to its release from the seat. Then, after the seat decelerates to a predetermined velocity, the rocket is disconnected from its connection with the ejection seat and the entire deployment mechanism 16 can extract the parachute 14 from its container 32 as illustrated in FIGS. 2-5. This rocket connection, drogue use, and sequencing is disclosed in U.S. Pat. No. 3,726,499, the disclosure of which is hereby incorporated by reference, and is advantageously conducted during low speed ejections. In ejections at higher speeds, the drogue parachute plays a larger role in extracting the main parachute.

The deployment mechanism 16 could also include a small pilot parachute connected to the first line 52 aft of the discard assembly for use in deploying the parachute under low speed ejections. In this case, the remaining parts of the deployment mechanism including the rocket 54 and the larger drogue parachute 58 could be disconnected above the pilot parachute as disclosed in U.S. Pat. No. 3,595,501, the disclosure of which is hereby incorporated by reference. In all events, the discard assembly 12 and actuator assembly 10 in accordance with the invention can be utilized with any type of deployment mechanism.

As seen best in FIGS. 7-9, the discard assembly 12 comprises a sear 60, a housing 62, a release pin 64 and a helical spring 66. The sear includes a first cylindrical rod 68 with a notch 70 formed at one end, a disk 72 coupled transversely to the other end of the first rod, and a flange 74 coupled perpendicularly to the disk. Flange 74 has an aperture 76 therein for reception of the first line 52 in the deployment mechanism as seen in FIGS. 8 and 9. Formed transversely in the first rod is a through bore 78 for the reception of a lead shear rivet 80 for shearably connecting the sear 60 to the housing 62 as seen in FIGS. 8 and 9. The shear value of this rivet is such that it will not shear upon extraction of the parachute from the container via the deployment mechanism but will shear under the forces generated by opening of the main parachute 14 which results in movement of the housing 62 towards the parachute under the pull of the lanyards as seen in FIG. 9. Rather than using the rivet, a tack tie cord can be utilized. Making the rivet of lead allows for an X-ray inspection of the discard assembly once the parachute is packed to assure proper connections of the discard assembly.

As seen in FIG. 7, the housing 62 is open-ended and hollow having a through passageway defined by a first, longitudinal cylindrical bore 82 and a second, longitudinal cylindrical bore 84 which is smaller in diameter than the first bore. The diameter of the second bore 84 is slightly larger than the outer diameter of the first rod 68 on the sear, this rod being slidably receivable in this bore as seen in FIG. 8. The diameter of the first bore 82 is such that it can slidably receive the helical spring 66. The shoulder 86 formed between the first and second coaxial bores receives one end of the helical spring 66 as it is placed into the first bore, as seen in FIGS. 8 and 9. On opposite sides of the housing adjacent the first bore are a pair of rigidly coupled flanges 88 and 90, each having an aperture 92 and 94 therein for the reception respectively of the ends of lanyards 18 and 20 as seen in FIGS. 8 and 9.

As seen in FIG. 7, release pin 64 comprises a second rod 96 having a first cylindrical portion 98 and a second cylindrical portion 100, and an eye 102 rigidly coupled to the end of the first cylindrical portion. As seen in FIGS. 8 and 9, strap 46 is connected to eye 102 and lanyards 18 and 20 are guided from the discard assembly towards the parachute by passing through the eye. The first cylindrical portion 98 has a diameter slightly smaller than the diameter of the first cylindrical bore 82 in the housing 62 so that it can be slidably received therein as illustrated in FIG. 9. The outer diameter of the second cylindrical portion 100 on the second rod 96 is slightly smaller than the inner diameter of the second bore 84 in the housing so that the second cylindrical portion can be slidably received therein as seen in FIGS. 8 and 9. Near the end of the second cylindrical portion 100 is a notch 104 which is engageable with the notch 70 in the first rod 68 on the sear 60 to releasably interconnect the sear and the release pin as shown in FIGS. 8 and 9. In this interconnected position, the first rod 68 is received in the housing with disk 72 engaging the end of the housing and the second cylindrical portion 100 on the release pin is received in the housing and within the spring 66. This spring is engaged with the shoulder 106 between cylindrical portions 98 and 100 to maintain the housing, sear and release pin in tension. In addition, in this position the shear rivet 80 is received through a transverse bore 108 in the side of the housing and in the transverse bore 78 in the first rod 68.

As best seen in FIGS. 8 and 9, the actuator assembly 10 in accordance with the invention comprises the first initiator lanyard 18, the second initiator lanyard 20, the first pulley ring 22, and the second pulley ring 24. These rings are connected to the parachute adjacent diametrically opposed sides of vent 40 via webbing 110 and 112, respectively, this webbing being suitably stitched or riveted to the hem 44 defining the vent 40.

The first lanyard 18 is coupled at one end to the discard assembly 12 via flange 88 and at the other end to the second ring 24 by, for example, looping the lanyard around the ring and attaching it to itself, this first lanyard also passing through the first ring 22. Similarly, the second lanyard 20 is coupled at one end to the discard assembly via flange 90 and is coupled at the other end to the first ring 22, this second lanyard passing through the second ring 24. While only one lanyard is likely necessary for actuating the discard assembly, using two as shown in FIGS. 8 and 9 is advantageous since it provides reliability through redundancy and symmetrical loading.

Operation

In use, the drogue parachute 58 is first stowed in its container 34 which is supported on the ejection seat 26, and the parachute 14 and discard assembly 12 carrying the actuator assembly 10 is packed in the other container 32.

Upon ejection as illustrated in FIGS. 1 and 2, the container 34 with its drogue parachute 58 is catapulted into the air stream and the drogue parachute is released from its container via the air stream and activated so as to slow down and stabilize the ejection seat and align the rocket 54 aft of the seat prior to its release.

After a predetermined lower velocity is reached, the deployment rocket 54 is disconnected from the seat itself and activated and thus pulls or extracts the parachute 14 and discard assembly 12 via line 52 from their container 32 on the seat, as shown in FIGS. 3 and 4. Then, the ballistic spreading device 48 is activated via snub line 50 to initiate opening of the canopy 38 on the parachute as shown in FIGS. 5 and 6.

After the canopy begins to open and it receives its first surge of air, the canopy will further inflate and transversely expand as illustrated when comparing FIGS. 5 and 6, as well as FIGS. 8 and 9, due to the air pressure resulting from the forward velocity of the seat upon ejection from the aircraft.

Since the deployment mechanism 16 holds taut the line 52, discard assembly 12, strap 46 and vent lines 42, the transverse expansion of the parachute canopy 14 generates a force that is transmitted along the lanyards 18 and 20 transversely of the parachute and longitudinally of the discard assembly to pull the housing 62 downwardly against spring 66 over the first cylindrical portion 98 as illustrated in FIG. 9.

When this happens, the notch interconnection of sear 60 and the release pin 64 is no longer enclosed by the housing and thus the sear and release pin can disconnect as illustrated in FIG. 9. Once this happens, the entire deployment mechanism 16 aft of the sear is discarded and separates from the remaining parachute.

As seen by comparing FIGS. 8 and 9, the transverse expansion of the canopy transversely expands the diameter of the vent 40. Since, for example, lanyard 18 is rigidly connected to the housing at one end and is rigidly connected to the second ring 24 (and thus the parachute) at the other end, the transverse expansion of the vent in effect pulls the lanyard through the first ring 22 which acts as a pulley, resulting in the downward movement of the housing. A similar action occurs with regard to the second lanyard 20 and the second ring 24, which is in this case the pulley.

Thus, the actuator assembly 10 disconnects the deployment mechanism from the parachute via actuating the discard assembly in response to the opening of the parachute by a preselected amount. As illustrated in FIGS. 8 and 9, this preselected amount is the transverse expansion sufficient to pull the housing 62 downwardly via the lanyards to expose the interconnected notches on the sear and release pin.

Embodiment of FIG. 10

The embodiment of the invention shown in FIG. 10 is similar to that shown in FIGS. 1-9, except that four pulley rings 22, 22', 24 and 24' are coupled to the parachute adjacent the vent 40, instead of two, and four initiator lanyards 18, 18', 20, and 20' extend between the housing 62' and the parachute, instead of two.

Rings 22 and 24 are diametrically opposed as in FIGS. 1-9, and rings 22' and 24' are also diametrically opposed, these four rings being spaced 90° C. apart around the vent 40.

Housing 62' has hour flanges 88, 88', 90 and 90' (not shown) for rigidly coupling, respectively, an end of each lanyard 18, 18', 20 and 20' to the housing.

First and second lanyards 18 and 20 pass through rings 22 and 24 and are fastened at their other ends, as in FIGS. 1-9, respectively, to rings 24 and 22. Similarly, the third lanyard 18' is coupled at one end to the housing and at the other end to the fourth ring 24' by, for example, looping the lanyard around the ring and attaching it to itself, this third lanyard also passing through the third ring 22'. Likewise, the fourth lanyard 20' is coupled at one end to the housing and at the other end to the third ring 22', this fourth lanyard passing through the fourth ring 24'.

The four rings and lanyards shown in FIG. 10 operate as discussed above regarding rings 22 and 24 and lanyards 18 and 20 in FIGS. 1-9; however, using four of each in diametrically opposed pairs increases the redundancy of the system and avoids a single point failure which could occur in the embodiment of FIGS. 1-9 if one ring were to separate from the parachute. Moreover, using four rings and lanyards, with the rings being spaced 90° apart, provides a more balanced pulling force on the housing.

While one advantageous embodiment has been chosen to illustrate the invention, it will be understood by those skilled in the art that various changes and modifications can be made therein without departing from the scope of the invention as defined in the appended claims.

What is claimed is:

1. In a parachute deployment assembly including a closed parachute packed in a container, a deployment mechanism for extracting the parachute from the container, and a discard assembly for discarding the deployment mechanism from the parachute, the improvement comprising:

means, coupled to the parachute and to the discard assembly, for actuating the discard assembly in response to the transverse opening of the parachute by a preselected amount, said means for actuating including means for transmitting the force generated by the transverse expansion of the parachute to the discard assembly.

2. The improvement according to claim 1, wherein said means comprises
   a ring coupled to the parachute adjacent the apex thereof, and
   a lanyard coupled at one end to the discard assembly and at the other end to the parachute, said lanyard passing through said ring.

3. In a parachute deployment assembly including a closed parachute packed in a container, a deployment mechanism for extracting the parachute from the container, and a discard assembly for discarding the deployment mechanism from the parachute, the improvement comprising:

means, coupled to the parachute and to the discard assembly, for actuating the discard assembly in response to the transverse opening of the parachute by a preselected amount, said means for actuating including
      first and second rings coupled to the parachute adjacent the apex thereof and spaced apart,
      a first lanyard coupled at one end to the discard assembly and at the other end to said second ring, said first lanyard passing through said first ring, and
      a second lanyard coupled at one end to the discard assembly and at the other end to said first ring, said second lanyard passing through said second ring.

4. The improvement according to claim 3, wherein the parachute includes a vent at its apex, and
   said first and second rings are located adjacent said vent.

5. The improvement according to claim 4, wherein said vent is substantially circular, and
   said first and second rings are located on opposed diametric sides of said circular vent.

6. The improvement according to claim 3, and further comprising
   guide means, coupled to the discard assembly, for guiding said first and second lanyards from the discard assembly, respectively, towards said first and second rings.

7. In a parachute deployment assembly including a closed parachute packed in a container, a deployment mechanism for extracting the parachute from the container, and a discard assembly for discarding the deployment mechanism from the parachute, the improvement comprising:

means, coupled to the parachute and to the discard assembly, for actuating the discard assembly in response to the transverse opening of the parachute by a preselected amount, said means for actuating including
      a ring coupled to the parachute adjacent the apex thereof, and
      a lanyard coupled at one end to the discard assembly and at the other end to the parachute, said lanyard passing through said ring,
   the parachute including a vent at its apex, and
   said ring being located adjacent one side of said vent with the other end of said lanyard being coupled to the parachute adjacent the other side of said vent.

8. An apparatus for discarding a parachute deployment mechanism which extracts a closed parachute from a container, the combination comprising:
   deployment means for extracting the parachute from the container;
   discard means, coupled to the parachute and to said deployment means, for releasably connecting the parachute and said deployment means; and
   actuator means, coupled to said discard means and to the parachute, for actuating said discard means to release the connection between the parachute and said deployment means in response to the transverse opening of the parachute by a preselected amount,
   said actuator means including means for transmitting the force generated by the transverse expansion of the parachute to said discard means.

9. An apparatus according to claim 8, wherein said deployment means comprises an auxiliary parachute.

10. An apparatus according to claim 9, wherein said deployment means further comprises a rocket.

11. An apparatus according to claim 8, wherein said deployment means comprises a rocket.

12. An apparatus according to claim 8, wherein said discard means comprises
    a first rod having a first notch at one end and being coupled to said deployment means at the other end,
    a second rod having a second notch at one end and being coupled to the parachute at the other end, said first and second notches being engageable to interconnect said first and second rods, and
an open-ended, hollow housing enclosing said first and second rods when they are interconnected.

13. An apparatus according to claim 8, wherein said actuator means comprises
a ring coupled to the parachute adjacent the apex thereof, and
a lanyard coupled at one end to said discard means and at the other end to the parachute, said lanyard passing through said ring.

14. An apparatus for discarding a parachute deployment mechanism which extracts a closed parachute from a container, the combination comprising:
deployment means for extracting the parachute from the container;
discard means, coupled to the parachute and to said deployment means, for releasably connecting the parachute and said deployment means; and
actuator means, coupled to said discard means and to the parachute, for actuating said discard means to release the connection between the parachute and said deployment means in response to the transverse opening of the parachute by a preselected amount,
said discard means comprising
a first rod having a first notch at one end and being coupled to said deployment means at the other end,
a second rod having a second notch at one end and being coupled to the parachute at the other end,
said first and second notches being engageable to interconnect said first and second rods, and
an open-ended, hollow housing enclosing said first and second rods when they are interconnected,
said actuator means comprising
a ring coupled to the parachute adjacent the apex thereof, and
a lanyard coupled at one end to said housing and at the other end to the parachute, said lanyard passing through said ring.

15. An apparatus according to claim 14, wherein the parachute includes a vent at its apex, and
said ring is located adjacent one side of said vent with the other end of said lanyard being coupled to the parachute adjacent the other side of said vent.

16. An apparatus for discarding a parachute deployment mechanism which extracts a closed parachute from a container, the combination comprising:
deployment means for extracting the parachute from the container;
discard means, coupled to the parachute and to said deployment means, for releasably connecting the parachute and said deployment means; and
actuator means, coupled to said discard means and to the parachute, for actuating said discard means to release the connection between the parachute and said deployment means in response to the transverse opening of the parachute by a preselected amount,
said actuator means comprising
a ring coupled to the parachute adjacent the apex thereof, and
a lanyard coupled at one end to said discard means and at the other end to the parachute, said lanyard passing through said ring,
the parachute including a vent at its apex, and
said ring being located adjacent one side of said vent with the other end of said lanyard being coupled to the parachute adjacent the other side of said vent.

17. An apparatus for discarding a parachute deployment mechanism which extracts a closed parachute from a container, the combination comprising:
deployment means for extracting the parachute from the container;
discard means, coupled to the parachute and to said deployment means, for releasably connecting the parachute and said deployment means; and
actuator means, coupled to said discard means and to the parachute, for actuating said discard means to release the connection between the parachute and said deployment means in response to the transverse opening of the parachute by a preselected amount,
said actuator means comprising
four rings coupled to the parachute adjacent the apex thereof, and
four lanyards, each coupled at one end to said discard means and at the other end to the parachute, each lanyard passing through a different one of said four rings.

18. A method of deploying a closed parachute from a container and discarding the deployment mechanism therefrom, comprising the steps of
pulling the parachute from the container via a deployment mechanism,
initiating the transverse opening of the parachute, and
disconnecting the deployment mechanism from the parachute in response to the transverse opening of the parachute by a preselected amount,
the disconnecting step including transmitting the force generated by the transverse expansion of the parachute to disconnect the deployment mechanism from the parachute.

* * * * *